April 13, 1943.  J. S. HODDY  2,316,693
OIL REGULATING SLEEVE FOR BEARINGS
Filed Oct. 5, 1938
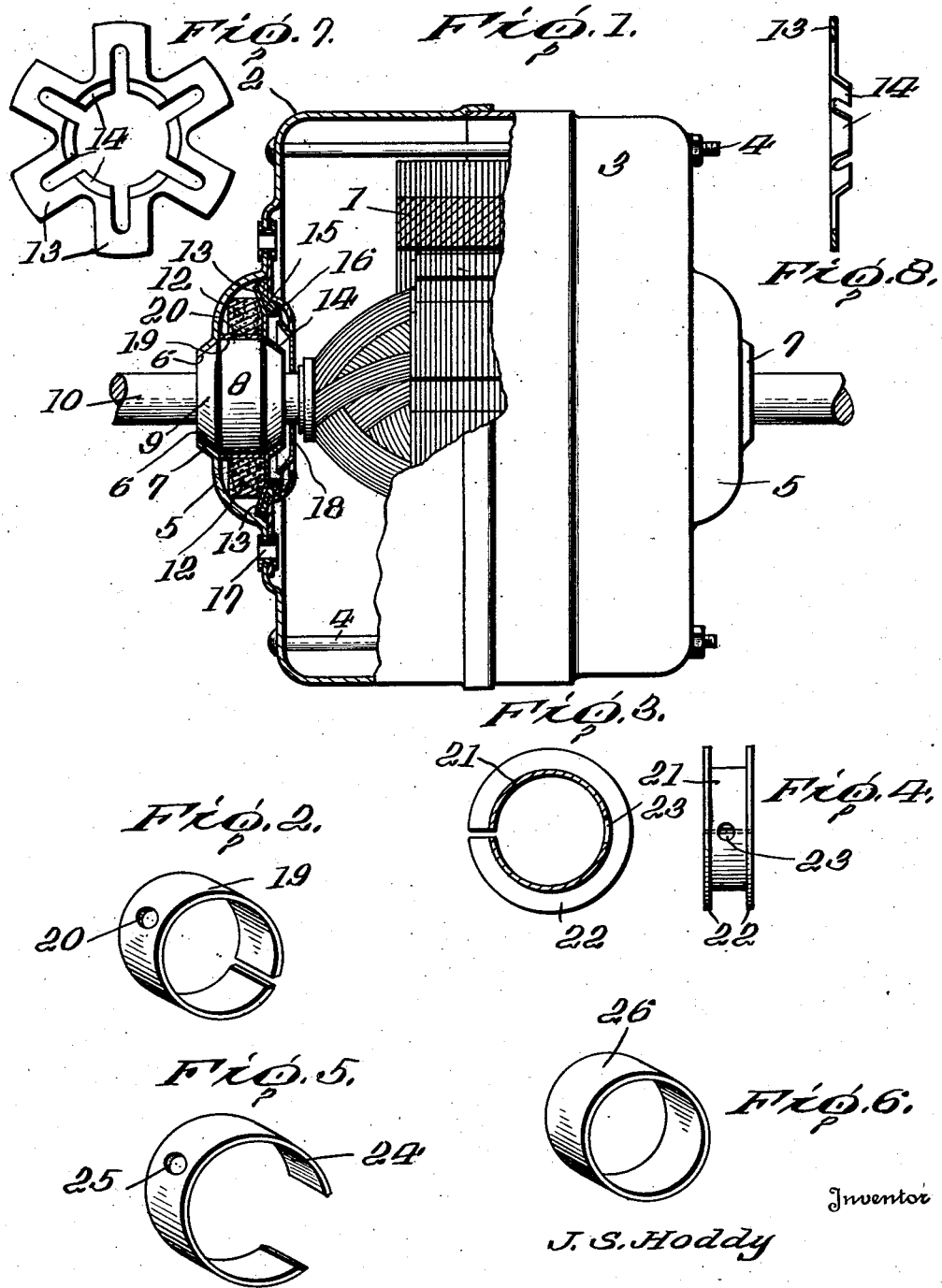
Inventor
J. S. Hoddy
By Pattison Wright & Pattison
Attorneys

Patented Apr. 13, 1943

2,316,693

UNITED STATES PATENT OFFICE 2,316,693

OIL REGULATING SLEEVE FOR BEARINGS

Joseph S. Hoddy, Owosso, Mich., assignor to A. G. Redmond Company, Owosso, Mich., a corporation of Michigan Application October 5, 1938, Serial No. 233,466

4 Claims. (Cl. 308—132)

This invention relates to an oil regulating sleeve for porous type self-lubricating bearings especially adapted to be used in connection with electric motors, the object being to provide means for retarding or controlling the supply of oil to the bearing, thereby prolonging the life of the lubrication bearing and preventing the lubricant from being wasted.

Another object of my invention is to provide regulating means in the form of a sleeve disposed between the bearing and the supply of lubricant so as to retard or control the absorption of the lubricant from the source of supply.

Another object of my invention is to provide regulating means which is exceedingly simple and cheap in construction and one which can be used in connection with either a porous type self-lubricating and self-aligning bearing or a sleeve type bearing without changing the construction of the bearing in any way.

Another and further object of the invention is to provide an oil regulating sleeve which is so constructed that the supply of oil to the bearing can be controlled to a nicety.

Other and further objects and advantages of the invention will be hereinafter set forth and the novel features thereof defined by the appended claims.

In the drawing,

Figure 1 is a side elevation, partly in section, of an electric motor showing the application of my improved construction of bearing thereto;

Figure 2 is a perspective view of the oil regulating sleeve detached;

Figure 3 is a transverse section through a slightly modified form of sleeve;

Figure 4 is an elevation of the same;

Figure 5 is a perspective view of a modified form of regulating sleeve formed of spring material;

Figure 6 is a perspective view of a modified form of regulating sleeve formed of suitable material which will check the oil flow to the bearing to allow the oil to flow by absorption;

Figure 7 is a plan view of the resilient retaining spider; and

Figure 8 is a transverse section through the same.

In the embodiment of my invention as herein shown, 1 indicates an electric motor enclosed in a sectional housing composed of sections 2 and 3 secured together in any desired manner as by bolts 4 to enable the sections to be assembled or separated.

The end of each section is formed with a substantially semi-spherical portion 5 apertured as shown at 6 and bent outwardly as shown at 7 to form a conical seat for the bearing as will be hereinafter fully described. As the end of each section is formed exactly alike, the description of one section will be sufficient for both.

My improved bearing comprises a cylindrical bearing 8 having beveled ends 9, one of which is adapted to fit within the conical seat 7 of the housing so as to form a self-aligning and a self-lubricating bearing for the armature shaft 10 of the electrical motor.

The bearing is surrounded by a felt ring 12 which is adapted to be saturated with oil so as to maintain the bearing 8 thoroughly lubricated. The bearing is secured in the housing by a resilient retaining member 13 preferably in the form of a spider having a conical seat 14 to receive the other beveled end of the bearing as clearly shown.

Arranged on the retainer member is a felt washer 15 which is engaged by an oil catcher 16 riveted to the housing as shown at 17 so as to hold the bearing assembled in the proper position to form a self-aligning bearing for the motor shaft. An oil throw washer 18 is disposed around the shaft as clearly shown so that when the bearing is assembled and retained in its proper position within the end of the housing of the motor any excess of lubricant will be prevented from being thrown within the housing by the rotation of the motor.

The bearing 8 is made from a mixture of very finely pulverized metal powder and graphite or carbon molded under extremely high pressure and baked at a very high temperature and in the baking process the graphite is removed by oxidation and the metal mixtures unite to form an alloy which is very porous. The porosity is usually about 30 to 50% so that it can readily absorb lubricant.

The bearing is next soaked in the desired lubricant, such as oil, at about 150 to 175° F. until the bearing is completely impregnated with the oil. The bearing is then removed from the oil and allowed to cool to room temperature and as this type of bearing has a great affinity for oil, as the temperature decreases in cooling, the surface oil is drawn into the bearing to such an extent that the outer surface is quite dry and free from lubricant. Upon the application of heat to a bearing thus treated, such as when the bearings are held in the hands or the frictional heat due to the shaft turning in the bearing, the oil comes to the surface which is the desired characteristic of such a type of bearing as the shaft is thoroughly lubricated thereby.

It has been found in practice that this type of bearing has an undesirable feature inasmuch as when the bearing temperature is increased, capillarity is increased to such an extent that the oil flows from the bearing all over and if not sufficiently enclosed and protected, it will flow not only into the motor housing but outside of the motor housing.

In the operation of a bearing as above described, when the motor is started and the bearing warms up, the capillary action is started to such an extent that the oil flows out of the felt through the bearing and out at the shaft where it is lost. In most cases the felt loses its oil in a very short time after running.

Another cause which tends to help the flow of oil out of the shaft is that the shaft acts as a small rotary pump which draws the oil out of the felt and discharges it at the bearing opening. Still another cause of oil flow is when the armature is unbalanced, the shaft vibrates in its bearings which produces a pressure in the bearing and forces the lubricant out the ends of the bearings. The lubricant will continue to flow, due to any one or a combination of the above reasons until the felt is left completely dry. The bearing retains a certain amount of lubricant, due to its great affinity for the lubricant, which is sufficient under ordinary conditions to keep the shaft from sticking in the bearing, but not sufficient to prevent bearing noise.

After the motor has been stopped, the bearing cools off and draws in oil from the bearing felt and any excess oil from the shaft. If the felt has a good supply of oil left, the bearing draws its oil from the felt and leaves excess oil on the shaft. This characteristic of the bearing is a good condition for lubrication but a bad condition for motors which have to be operated in sub-zero temperatures as in that case the heavy oil film will prevent the motor from coming up to speed. In some cases where the motor is very weak, the motor will be prevented from starting.

I am aware that this condition may be helped considerably by using a very light oil in zero-polar temperatures but oils of this nature do not stand up at high temperatures at which the motor must operate in. In case the felt is dry, the bearing draws oil from the shaft and offers a minimum amount of resistance to starting in sub-zero temperatures.

The above description of a porous type bearing is given so that the operation and the advantages obtained by my oil regulating sleeve will be thoroughly understood and while I have shown and described a particular type of bearing used in connection with an electric motor, I wish it to be clearly understood that I do not wish to limit myself to the particular type of bearing as I am aware that my regulating sleeve can be used with various types of bearings so as to accomplish the desired result.

I have found by experimenting that by placing a sleeve 19 around the bearing 8 between the bearing and the felt 12 that the quantity of lubricant supplied to the porous bearing can be regulated to a nicety so as to increase the life of the lubricating features of the bearing and overcome all of the difficulties now existing with this type of bearing.

In the preferred form of regulating sleeve as shown in Figures 1 and 2, I show a split sleeve having an oil regulating opening 20 and the inner circumference of the sleeve is substantially the same as the outer circumference of the bearing 8 so that when the sleeve is in position the ends will abut one another to form a crack. With the sleeve so disposed, the size of the opening 20 will determine the amount of lubricant that the bearing 8 can absorb from the lubricating felt 12 and I am aware that one or more openings can be used for regulating the supply of lubricant, all of which will depend upon the size and nature of the bearing to which the regulator is applied.

I am also aware that it would be possible to dispense with the oil regulating opening 20 and form the sleeve of such a diameter that the ends when in position on the bearing would not abut one another and would form a regulating opening for controlling the supply of lubricant to the bearing, therefore I do not wish to limit myself to any particular construction of sleeve so long as the sleeve will be constructed so as to have a predetermined size opening for regulating the supply of lubricant to the bearing.

In the modified form shown in Figs. 3 and 4, the split sleeve 21 is provided with a flange 22 at each end to receive the felt washer and is provided with an oil regulating opening 23 for regulating the supply of lubricant to the bearing. This provides additional means for controlling the supply of lubricant as the felt will be protected from the bearing and prevent the oil from passing to the bearing over the edges.

In Figure 5 I show an oil regulating sleeve 24 formed of spring material so as to force the felt washer against the hole 25 in the sleeve.

In the modification shown in Figure 6 I show a regulating sleeve 26 formed as a section of a tube instead of being split and formed of material of such a nature that the oil will pass therethrough by absorption without coming in contact with the bearing. This type of regulating sleeve would allow a certain amount of lubricant to pass therethrough per unit of time so that the amount of lubricant supplied to the bearing would be controlled to a nicety and while I am aware that various materials can be used, I do not wish to limit myself to any particular nature of the material in forming this type of regulating sleeve as it might be constructed in various ways without departing from the spirit of my invention.

My invention, while simple in construction, enables the supply of lubricant to be controlled to a nicety so as to overcome the difficulties existing with this type of bearing and while I am aware that various other types of regulating sleeves could be formed, I have found in practice that under normal conditions to which a motor is subjected that a plain sleeve with an opening will regulate the supply of lubricant to the porous bearing so as to overcome all the difficulties existing in bearings of this type.

While in the drawing I have illustrated and described a split apertured metal sleeve for regulating the flow of oil, I wish it to be clearly understood that the sleeve can be formed solid of any kind of material and that it can be a plain sleeve or a sleeve having a flange at one end or a sleeve having a flange at both ends and can have one or more regulating openings or if a split sleeve is used, the openings can be dispensed with and the sleeve formed of such a size as to form a regulating opening of the desired size between the ends thereof.

From the foregoing description it will be seen that I have provided a bearing especially adapted to be used in connection with an electric motor although my invention is capable of being used for various other purposes and therefore I do not wish to limit myself to the particular use of the bearing as my invention consists broadly in arranging means between a bearing and a source of lubricant supply for regulating the supply of lubricant to said bearing and I am aware that various changes can be made without departing from the spirit of my invention.

What I claim is:

1. In a bearing construction for motors, a bearing adapted to rotatably support a shaft and having substantially beveled end portions, a rigid housing element having a perforation formed to receive the outboard end of the bearing, a lubricant absorbing washer encircling the intermediate bearing portion and engaging the inner wall of the housing element, a retaining element engaging the in-board end of the bearing, a second lubricant absorbing washer engaging the retaining element, said washers cooperating to position said retaining element out of contact with said housing, and clamping means for maintaining the retaining element in compressive engagement between said washers.

2. In a bearing construction, a bearing having spaced beveled end portions, a metallic housing having a portion conforming to and engaging one beveled end portion of the bearing, a lubricant absorbing washer engaging the intermediate portion of the bearing in encircling relation, the washer being seated within the housing in spaced relation to the portion of the housing engaging the bearing whereby a reservoir is formed therebetween, a metallic bearing retaining element abutting the washer and having a portion engaging the other beveled end portion of the bearing, the retaining element being spaced radially from the housing, a second lubricant absorbing washer engaging the retaining element, a clamping element associated with the housing and engaging the second washer to compressively dispose the retaining element between the washers, the clamping element having portions spaced from the second washer to form a lubricant reservoir, and an oil flinging element rotatable with the shaft disposed in said second reservoir.

3. A bearing construction for electric motors comprising a relatively rigid end wall of the motor housing outwardly dished to provide a cup portion and a relatively reduced portion, the reduced portion being centrally perforated to receive a rotatable shaft, a bearing supporting the shaft and formed as a lubricant transmitting material, the bearing being beveled to form inner and outer shoulders, the outer bearing shoulder being seated within the reduced portion of the housing end wall, a lubricant absorbing washer seated within the cup portion of the housing end wall and encircling an intermediate portion of the bearing, a sheet metal retaining element abutting the inner side of the washer and being formed to receive the inner shoulder of the bearing, said retaining element being spaced axially from said housing by said washer, a second lubricant absorbing washer abutting the inner face of the said retaining element, a radially extending rigid element secured to the motor housing and compressively engaging the said second washer, and an oil flinging element rotatable with the shaft and disposed inwardly of the said second washer.

4. In a bearing construction, a bearing having a beveled end portion to provide spaced shoulders, a metallic housing having a portion conforming to and grippingly engaging one of said bearing shoulders, a lubricant absorbing washer encircling an intermediate portion of the bearing and engaging the housing, a metal retaining element spaced axially from said housing and having an inner portion engaging the other shoulder of the bearing and abutting the washer, a second lubricant absorbing washer engaging the retaining element, and a clamping element engaging said second washer whereby the retaining element is maintained against axial movement and out of contact with the housing by said washers.

JOSEPH S. HODDY.